(12) United States Patent
Kawanishi et al.

(10) Patent No.: US 11,353,103 B2
(45) Date of Patent: Jun. 7, 2022

(54) CONTROL DEVICE FOR VEHICLE OIL SUPPLY DEVICE

(71) Applicant: TOYOTA JIDOSHA KABUSHIKI KAISHA, Toyota (JP)

(72) Inventors: Hiroshi Kawanishi, Nisshin (JP); Kiyonori Takagi, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 338 days.

(21) Appl. No.: 16/801,239

(22) Filed: Feb. 26, 2020

(65) Prior Publication Data
US 2020/0292054 A1    Sep. 17, 2020

(30) Foreign Application Priority Data

Mar. 13, 2019    (JP) .............................. JP2019-046500

(51) Int. Cl.
| | | |
|---|---|---|
| *F16H 57/04* | (2010.01) | |
| *F01M 1/12* | (2006.01) | |
| *F01M 1/16* | (2006.01) | |
| *H02K 7/116* | (2006.01) | |
| *H02K 9/19* | (2006.01) | |

(52) U.S. Cl.
CPC ........... *F16H 57/0476* (2013.01); *F01M 1/12* (2013.01); *F01M 1/16* (2013.01); *F16H 57/0404* (2013.01); *F16H 57/0436* (2013.01); *F16H 57/0441* (2013.01); *F16H 57/0446* (2013.01); *H02K 7/116* (2013.01); *H02K 9/19* (2013.01); *F01M 2001/123* (2013.01); *F01M 2250/60* (2013.01)

(58) Field of Classification Search
CPC ............. F16H 57/0476; F16H 57/0404; F16H 57/0436; F16H 57/0441; F16H 57/0446; F01M 1/16; F01M 1/12; F01M 2001/123; F01M 2250/60; H02K 7/116; H02K 9/19
See application file for complete search history.

(56) References Cited

U.S. PATENT DOCUMENTS

| | | | |
|---|---|---|---|
| 5,372,213 A | 12/1994 | Hasebe et al. | |
| 8,909,402 B2* | 12/2014 | Miyamoto | ............. H02K 9/193 903/902 |
| 11,114,921 B2* | 9/2021 | Ito | ........................ F16H 57/0471 |

(Continued)

FOREIGN PATENT DOCUMENTS

| | | |
|---|---|---|
| EP | 2 428 703 A2 | 3/2012 |
| JP | 2014-003754 A | 1/2014 |
| WO | WO 2018/061443 A1 | 5/2018 |

*Primary Examiner* — Michael A Riegelman
(74) *Attorney, Agent, or Firm* — Oblon, McClelland, Maier & Neustadt, L.L.P.

(57) ABSTRACT

There is provided a control device for a vehicle oil supply device that includes a mechanical oil pump configured to be rotatable forward and in reverse, an electric oil pump configured to suction oil stored in an oil storage portion that is common to the mechanical oil pump and the electric oil pump, a first filtering member provided to a first strainer of the mechanical oil pump, and a second filtering member provided to second strainer of the electric oil pump. The control device includes a controller configured to control the rotational speed of the electric oil pump. The controller is configured to restrict the rotational speed of the electric oil pump when the mechanical oil pump is rotated in reverse compared to when the mechanical oil pump is rotated forward.

12 Claims, 6 Drawing Sheets

(56) References Cited

U.S. PATENT DOCUMENTS

| | | | |
|---|---|---|---|
| 2013/0173104 A1* | 7/2013 | Miyamoto | F16H 61/0021 |
| | | | 903/902 |
| 2015/0345616 A1* | 12/2015 | Schweiher | F16H 57/045 |
| | | | 184/6.12 |
| 2017/0167596 A1* | 6/2017 | Nishimine | F16H 57/0435 |
| 2017/0219085 A1* | 8/2017 | Kiyokami | F01M 1/02 |
| 2019/0128399 A1* | 5/2019 | Shin | F16H 57/0436 |
| 2019/0229582 A1* | 7/2019 | Ito | F16H 57/0436 |
| 2019/0249765 A1* | 8/2019 | Ito | F16H 57/0471 |
| 2019/0316498 A1* | 10/2019 | Koguchi | F01L 1/3442 |
| 2020/0292054 A1* | 9/2020 | Kawanishi | F16H 57/0441 |

* cited by examiner

CONTROL DEVICE FOR VEHICLE OIL SUPPLY DEVICE

CROSS-REFERENCE TO RELATED APPLICATIONS

This application claims priority to Japanese Patent Application No. 2019-046500 filed on Mar. 13, 2019 incorporated herein by reference in its entirety.

BACKGROUND

1. Technical Field

The present disclosure relates to a control device for a vehicle oil supply device that includes a mechanical oil pump configured to be rotatable in reverse and an electric oil pump.

2. Description of Related Art

There is known a vehicle oil supply device that includes a mechanical oil pump driven in conjunction with rotation of drive wheels of a vehicle, and an electric oil pump driven by a motor. International Patent Application Publication No. 2018/061443 (WO 2018/061443 A1) describes such a device.

SUMMARY

In the configuration described in WO 2018/061443 A1 in which the mechanical oil pump is driven in conjunction with rotation of the drive wheels of the vehicle, the mechanical oil pump is rotatable in reverse. When the mechanical oil pump is rotated in reverse in a configuration in which the mechanical oil pump and the electric oil pump include respective separate filtering members, foreign matter adhering to the filtering member of the mechanical oil pump is released into oil. In the case where the electric oil pump is being driven at this time, oil containing the foreign matter is suctioned by the electric oil pump, and therefore the foreign matter may be partially deposited on the filtering member of the electric oil pump. If the foreign matter is partially deposited on the filtering member of the electric oil pump in this manner, the performance of the electric oil pump may be lowered.

The present disclosure provides a control device for a vehicle oil supply device that includes a mechanical oil pump that is rotatable in reverse and an electric oil pump, the control device being able to suppress partial deposition of foreign matter on the electric oil pump.

An aspect of the present disclosure relates to a control device for a vehicle oil supply device that includes a mechanical oil pump, an electric oil pump, a first filtering member, and a second filtering member. The mechanical oil pump is configured to be rotatable forward and in reverse. The electric oil pump is configured to suction oil stored in an oil storage portion common to the mechanical oil pump. The first filtering member is provided to a first strainer of the mechanical oil pump. The second filtering member is provided to a second strainer of the electric oil pump. The control device includes a controller configured to control a rotational speed of the electric oil pump. The controller is configured to restrict the rotational speed of the electric oil pump when the mechanical oil pump is rotated in reverse compared to when the mechanical oil pump is rotated forward.

With the control device for a vehicle oil supply device according to the aspect of the present disclosure, in which the rotational speed of the electric oil pump is restricted even in the case where the mechanical oil pump is rotated in reverse, the amount of foreign matter accumulated on the filtering member on the side of the electric oil pump is reduced, and partial deposition of foreign matter on each of the filtering members is suppressed. Thus, a reduction in the performance of the electric oil pump is suppressed.

In the control device for a vehicle oil supply device according to the aspect described above, the controller may be configured to restrict the rotational speed of the electric oil pump such that the rotational speed of the electric oil pump does not exceed a first threshold when the mechanical oil pump is rotated in reverse.

With the control device for a vehicle oil supply device configured as described above, in which the rotational speed of the electric oil pump is restricted such that the rotational speed of the electric oil pump does not exceed the first threshold, the amount of oil suctioned by the electric oil pump is restricted, and the amount of foreign matter that adheres to the filtering member of the electric oil pump is reduced. Hence, partial deposition of foreign matter on the filtering member of the electric oil pump is suppressed, and a reduction in the performance of the electric oil pump is suppressed.

In the control device for a vehicle oil supply device according to the aspect described above, the controller may be configured to restrict the rotational speed of the electric oil pump such that the rotational speed of the electric oil pump does not exceed a second threshold when a temperature of an electric motor cooled by oil dispensed at least from the electric oil pump is equal to or more than a predetermined temperature set in advance, the second threshold being set to a value that is larger than the first threshold.

With the control device for a vehicle oil supply device configured as described above, in which the rotational speed of the electric oil pump is restricted such that the rotational speed of the electric oil pump does not exceed the second threshold, which is set to a value that is larger than the first threshold, when the temperature of the electric motor is equal to or more than a predetermined temperature, the electric motor can be prevented from reaching a high temperature.

In the control device for a vehicle oil supply device according to the aspect described above, the controller may be configured to restrict the rotational speed of the electric oil pump such that the rotational speed of the electric oil pump does not exceed a second threshold when a temperature of oil dispensed at least from the electric oil pump is equal to or more than a predetermined temperature set in advance, the second threshold being set to a value that is larger than the first threshold.

In the control device for a vehicle oil supply device according to the aspect described above, the controller may be configured to cancel restriction on the rotational speed of the electric oil pump when a temperature of an electric motor cooled by oil dispensed at least from the electric oil pump is equal to or more than a predetermined temperature set in advance.

With the control device for a vehicle oil supply device configured as described above, in which the restriction on the rotational speed of the electric oil pump is canceled when the temperature of the electric motor is equal to or more than a predetermined value, the electric motor can be prevented from reaching a high temperature by supplying oil required to cool the electric motor to the electric motor with priority given to cooling of the electric motor by the electric oil pump.

In the control device for a vehicle oil supply device according to the aspect described above, the controller may be configured to stop the electric oil pump when the mechanical oil pump is rotated in reverse.

With the control device for a vehicle oil supply device configured as described above, in which the electric oil pump is stopped when the mechanical oil pump is rotated in reverse, partial deposition of foreign matter on the filtering member of the electric oil pump can be effectively suppressed.

In the control device for a vehicle oil supply device according to the aspect described above, the controller may be configured to maintain restriction on the rotational speed of the electric oil pump until a predetermined time elapses since the mechanical oil pump is switched from reverse rotation to forward rotation.

With the control device for a vehicle oil supply device configured as described above, in which the restriction on the rotational speed of the electric oil pump is maintained until a predetermined time elapses since the mechanical oil pump is switched from reverse rotation to forward rotation, partial deposition of foreign matter is further suppressed with foreign matter released from the filtering member of the mechanical oil pump accumulated on the filtering member again.

In the control device for a vehicle oil supply device according to the aspect described above, the controller may be configured to stop restricting the rotational speed of the electric oil pump instantly when the mechanical oil pump is switched from reverse rotation to forward rotation.

With the control device for a vehicle oil supply device configured as described above, the amount of foreign matter accumulated on the filtering member on the side of the electric oil pump has been reduced and partial deposition of foreign matter on the filtering member of each of the filtering members has been suppressed, even if the restriction on the rotational speed of the electric oil pump is stopped instantly when the mechanical oil pump is switched from reverse rotation to forward rotation, since the rotational speed of the electric oil pump was restricted when the mechanical oil pump was rotated in reverse. Thus, a reduction in the performance of the electric oil pump is suppressed.

In the control device for a vehicle oil supply device according to the aspect described above, a suction opening of the mechanical oil pump and a suction opening of the electric oil pump may be disposed adjacent to each other in the vehicle oil supply device.

With the control device for a vehicle oil supply device configured as described above, in which the suction opening of the mechanical oil pump and the suction opening of the electric oil pump are disposed adjacent to each other in the vehicle oil supply device, foreign matter accumulated on the filtering member of the mechanical oil pump is easily movable to the filtering member of the electric oil pump when the mechanical oil pump is rotated in reverse. However, partial deposition of foreign matter on the filtering member of the electric oil pump is suppressed with the rotational speed of the electric oil pump restricted.

In the control device for a vehicle oil supply device according to the aspect described above, the vehicle oil supply device may include an oil path provided between a dispensing port of the electric oil pump and a second dispensing port of the mechanical oil pump.

With the control device for a vehicle oil supply device configured as described above, a part of oil dispensed from the electric oil pump is supplied to the mechanical oil pump through the oil path which is provided between the dispensing port of the electric oil pump and the second dispensing port of the mechanical oil pump when the mechanical oil pump is rotated in reverse. Thus, a seizure of gears of the mechanical oil pump can be suppressed.

In the control device for a vehicle oil supply device according to the aspect described above, the oil path may include a check valve configured to allow the oil to irreversibly flow from the dispensing port of the electric oil pump to the second dispensing port of the mechanical oil pump.

With the control device for a vehicle oil supply device configured as described above, a part of oil dispensed from the electric oil pump is continuously irreversibly supplied to the mechanical oil pump during reverse rotation of the mechanical oil pump. Thus, a seizure of gears of the mechanical oil pump can be suppressed reliably.

In the control device for a vehicle oil supply device according to the aspect described above, the mechanical oil pump may be configured to be driven by a rotary member that operates in conjunction with an axle of a vehicle.

With the control device for a vehicle oil supply device configured as described above, in which the mechanical oil pump is driven by the rotary member which operates in conjunction with the axle, the mechanical oil pump is rotated in reverse in the case where the axles are rotated in the direction in which the vehicle travels rearward, for example. At this time, oil may flow in reverse in the mechanical oil pump, and foreign matter may be partially deposited on the side of the filtering member of the electric oil pump. However, partial deposition of foreign matter is suppressed with the rotational speed of the electric oil pump restricted.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
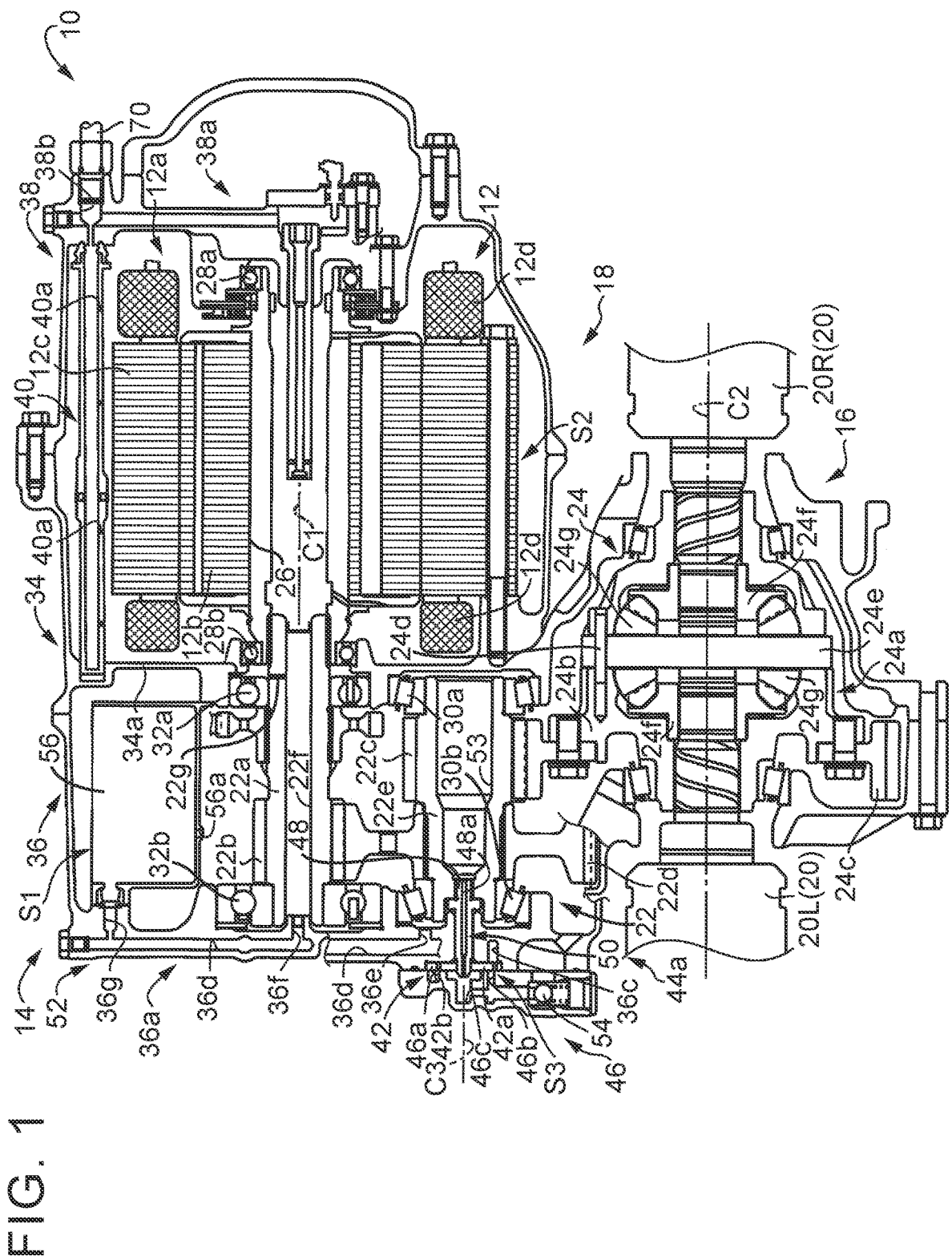
FIG. 1 is a sectional view illustrating the configuration of a drive device for an electric vehicle to which a control device for a vehicle oil supply device according to a first embodiment of the present disclosure is applied.

First to fourth embodiments of the present disclosure will be described in detail below while referring to the drawings. In the drawings, the first to fourth embodiments described below are simplified or deformed as appropriate, and the dimensional ratios, shapes, etc. of various portions are not necessarily exact.

FIG. 1 is a sectional view illustrating the configuration of an electric vehicle 10 to which a control device for a vehicle oil supply device according to a first embodiment of the present disclosure is applied. The electric vehicle 10 includes a drive device (vehicle drive device) 14 that drives a pair of right and left drive wheels (not illustrated) using an electric motor 12 as a drive force source for travel. As illustrated in FIG. 1, the drive device 14 includes the electric motor 12, a power transfer mechanism 16 that transfers a drive force from the electric motor 12 to the pair of right and left drive wheels or transfers a drive force from the pair of right and left drive wheels to the electric motor 12, a housing case 18 that houses the electric motor 12, the power transfer mechanism 16, etc., and an axle 20 including a pair of a right axle 20R and a left axle 20L that rotate together with the pair of right and left drive wheels. The power transfer mechanism 16 is provided with a gear mechanism 22 coupled to the electric motor 12 so as to be able to transfer power, and a differential device (differential gear mechanism) 24 coupled to the gear mechanism 22 so as to be able to transfer power.

As illustrated in FIG. 1, the electric motor 12 includes a cylindrical stator 12a fixed to the housing case 18, for example, and a cylindrical rotor 12b fixed to a rotor shaft 26 with a predetermined gap from the inner peripheral side of the cylindrical stator 12a. The cylindrical rotor shaft 26 which penetrates the cylindrical rotor 12b to be fixed integrally therewith is supported on the housing case 18 via a pair of first bearings 28a and 28b so as to be rotatable about a first rotational axis C1. The stator 12a includes coil ends 12d wound around a stator core 12c on both sides in the direction of the first rotational axis C1.

As illustrated in FIG. 1, the differential device 24 includes: a differential case 24a in a container shape supported so as to be rotatable about a second rotational axis C2; a differential ring gear (ring gear) 24c fixed to an outer peripheral portion 24b of the differential case 24a; a pinion shaft 24e in a circular column shape, both end portions of which are supported by the differential case 24a and which is fixed to the differential case 24a by a dowel pin 24d in the posture of being orthogonal to the second rotational axis C2; a pair of side gears 24f disposed to face each other with the pinion shaft 24e interposed therebetween so as to be rotatable about the second rotational axis C2, the pair of side gears 24f being housed in the differential case 24a; and a pair of pinions 24g that rotate together with the differential case 24a in the state of being rotatably supported by the pinion shaft 24e which is inserted through the pair of pinions 24g, the pair of pinions 24g being meshed with the pair of side gears 24f. In the differential device 24 configured in this way, when torque (drive force) from the electric motor 12 is input to the differential ring gear 24c via the gear mechanism 22, the input torque from the electric motor 12 is distributed to the pair of right and left drive wheels while allowing differential rotation of the pair of side gears 24f which rotate together with the pair of right and left axles 20R and 20L, respectively. The electric motor 12 is an example of the electric motor according to the present disclosure.

As illustrated in FIG. 1, the gear mechanism 22 includes: a cylindrical first rotary shaft 22a coupled to the rotor shaft 26, which is provided to the electric motor 12, so as to be able to transfer power; a pinion 22b formed integrally with the first rotary shaft 22a; a small diameter gear 22c meshed with the differential ring gear 24c which is provided to the differential device 24; a large diameter gear 22d meshed with the pinion 22b which is formed on the first rotary shaft 22a, the large diameter gear 22d being larger in diameter than the small diameter gear 22c; and a cylindrical second rotary shaft 22e fixed integrally with the small diameter gear 22c and the large diameter gear 22d. In the gear mechanism 22, the second rotary shaft 22e is supported on the housing case 18 via a pair of second bearings 30a and 30b, which are provided at both end portions of the second rotary shaft 22e, so as to be rotatable about a third rotational axis C3. Meanwhile, the first rotary shaft 22a is supported on the housing case 18 via a pair of third bearings 32a and 32b, which are provided at both end portions of the first rotary shaft 22a, so as to be rotatable about the first rotational axis C1.

The housing case 18 includes a first case member 34, a second case member 36 fixed integrally with the first case member 34 by a bolt, and a third case member 38 fixed integrally with the first case member 34 by a bolt. A first housing space S1 surrounded by the first case member 34 and the second case member 36 and a second housing space S2 surrounded by the first case member 34 and the third case member 38 are formed in the housing case 18. The first housing space S1 houses the gear mechanism 22, the differential device 24, etc. The second housing space S2 houses the electric motor 12 etc. The first case member 34 includes a partition wall 34a formed to separate the first housing space S1 and the second housing space S2 from each other. The second case member 36 includes a wall portion 36a formed to face the partition wall 34a of the first case member 34. The third case member 38 includes a wall portion 38a formed to face the partition wall 34a of the first case member 34.

As illustrated in FIG. 1, a pipe-shaped cooling pipe 40 is disposed in the second housing space S2. The cooling pipe 40 is disposed vertically above the electric motor 12, and discharges oil through a plurality of dispensing holes 40a to cool the electric motor 12. The cooling pipe 40 is disposed in parallel with the first rotational axis C1. An oil flow path 38b is formed in the wall portion 38a of the third case member 38. Oil dispensed from an electric oil pump 64 (see FIG. 4) flows into the oil flow path 38b by way of an external conduit 70. The oil which has flowed into the oil flow path 38b is introduced into the cooling pipe 40. The electric oil pump 64 is provided to exclusively cool the electric motor 12. The electric oil pump 64, the oil flow path 38b, and the cooling pipe 40 constitute a cooling device 44b (see FIG. 4), to be discussed later, that cools the electric motor 12.

As illustrated in FIG. 1, the drive device 14 is provided with a lubrication device 44a that includes a mechanical oil pump 42, suctions oil (lubricating oil) stored in the housing case 18 using the mechanical oil pump 42, and supplies the suctioned oil to the power transfer mechanism 16 etc. to lubricate the power transfer mechanism 16 etc.

The mechanical oil pump 42 is an internal gear oil pump. The mechanical oil pump 42 includes: an inner rotor 42a in a circular ring shape having a plurality of outer peripheral teeth and supported so as to be rotatable about the third rotational axis C3 by a pump drive shaft 48 coupled to the second rotary shaft 22e; and an outer rotor 42b in a circular ring shape having a plurality of inner peripheral teeth meshed with the outer peripheral teeth of the inner rotor 42a and supported so as to be rotatable about a rotational axis that is eccentric from the third rotational axis C3 by a recessed portion formed in the wall portion 36a of the second case member 36. The inner rotor 42a and the outer rotor 42b are housed in a pump chamber S3 formed by the wall portion 36a of the second case member 36 and a pump cover 46 attached to the wall portion 36a of the second case member 36. The inner rotor 42a is coupled so as to be non-rotatable relative to the pump drive shaft 48. The pump drive shaft 48 rotates in conjunction with the axle 20 via the second rotary shaft 22e, the differential device 24, etc. In other words, the mechanical oil pump 42 is driven by the pump drive shaft 48 which operates in conjunction with the axle 20. The pump drive shaft 48 also rotates in conjunction with the electric motor 12. Thus, the mechanical oil pump 42 is also considered to be driven by the electric motor 12. The pump drive shaft 48 is an example of the rotary member which operates in conjunction with the axle according to the present disclosure.

The mechanical oil pump 42 also includes: a suction port 46a formed in a sliding surface of the pump cover 46 with the inner rotor 42a and the outer rotor 42b and connected to an MOP-side suction oil path 66 (see FIG. 4) through which oil stored in the first housing space S1 of the housing case 18 is suctioned; a first dispensing port 46b formed in the pump cover 46 to dispense oil suctioned through the suction port 46a; and a second dispensing port 36c formed in the second case member 36 to dispense oil suctioned through the suction port 46a.

In the mechanical oil pump 42, when the second rotary shaft 22e and the pump drive shaft 48 which is coupled to the second rotary shaft 22e are rotated about the third rotational axis C3 during forward travel, the inner rotor 42a which is coupled to the pump drive shaft 48 is also driven to be rotated about the third rotational axis C3. At this time, oil stored in the first housing space S1 of the housing case 18 is suctioned, and taken through the suction port 46a into any one of a plurality of spaces separated by the inner peripheral teeth of the outer rotor 42b and the outer peripheral teeth of the inner rotor 42a. When the oil which is taken into the space described above is carried in a direction of rotation of the inner rotor 42a that decreases the capacity of the space as the inner rotor 42a rotates in such a direction, the oil is dispensed through the first dispensing port 46b and the second dispensing port 36c.

The mechanical oil pump 42 is not provided with a one-way clutch, for example, that prevents reverse rotation of the mechanical oil pump 42, that is, reverse rotation (i.e. rotation during rearward travel) of the inner rotor 42a in the opposite direction from that during forward travel. Thus, the mechanical oil pump 42 is an oil pump driven with the inner rotor 42a rotated always in conjunction with rotation of the second rotary shaft 22e of the gear mechanism 22. The case where the mechanical oil pump 42 is rotated in reverse corresponds to rearward travel of the electric vehicle 10.

The lubrication device 44a includes a first supply oil path 50 through which a part of oil dispensed from the mechanical oil pump 42 is supplied to the second bearing 30a, for example, and a second supply oil path 52 through which a part of oil dispensed from the mechanical oil pump 42 is supplied to the gear mechanism 22, the second bearing 30b, and the third bearing 32a, for example.

The first supply oil path 50 includes an axial oil path 48a that penetrates the pump drive shaft 48 in the axial direction, an oil supply oil path 46c which is formed in the pump cover 46 and through which oil dispensed through the first dispensing port 46b is supplied to the axial oil path 48a of the pump drive shaft 48, and an axial oil path 53 that penetrates the second rotary shaft 22e in the axial direction. In the first supply oil path 50 configured in this way, when oil is dispensed through the first dispensing port 46b by the mechanical oil pump 42, the oil is supplied to the second bearing 30a through the oil supply oil path 46c, the axial oil path 48a of the pump drive shaft 48, and the axial oil path 53 of the second rotary shaft 22e. The pump cover 46 is provided with a relief valve 54 through which a part of oil dispensed through the first dispensing port 46b of the mechanical oil pump 42 is discharged in the case where the amount of oil dispensed from the mechanical oil pump 42 to the oil supply oil path 46c is excessive, for example, in the case where the oil pressure is abnormally high because of clogging of an oil path, etc.

The second supply oil path 52 includes: a dispensing oil path 36d formed in the wall portion 36a of the second case member 36 along the wall portion 36a and connected to the second dispensing port 36c; a first branch oil path 36e branched from the dispensing oil path 36d to communicate with a space around the second bearing 30b in the first housing space S1; a second branch oil path 36f branched from the dispensing oil path 36d to communicate with an axial oil path 22f which penetrates the first rotary shaft 22a in the axial direction; and a third branch oil path 36g branched from the dispensing oil path 36d to store a part of oil dispensed from the mechanical oil pump 42 in a catch tank 56. The second supply oil path 52 further includes the axial oil path 22f of the first rotary shaft 22a, a radial oil path 22g formed in the first rotary shaft 22a, the catch tank 56 which is provided on the dispensing side of the mechanical oil pump 42, and a discharge opening 56a formed in the catch tank 56.

In the second supply oil path 52 configured as described above, oil is dispensed through the second dispensing port 36c of the mechanical oil pump 42, and the oil is supplied to the dispensing oil path 36d. A part of the oil which is dispensed to the dispensing oil path 36d is supplied to the second bearing 30b through the first branch oil path 36e. A part of the oil which is dispensed to the dispensing oil path 36d is supplied to the third bearing 32a through the second branch oil path 36f, the axial oil path 22f of the first rotary shaft 22a, and the radial oil path 22g of the first rotary shaft 22a. A part of the oil which is dispensed to the dispensing oil path 36d is stored in the catch tank 56 through the third branch oil path 36g, and the oil which is stored in the catch tank 56 is discharged to the pinion 22b which is formed on the first rotary shaft 22a through the discharge opening 56a which is formed in the catch tank 56. Oil splashed by rotation of the differential ring gear 24c of the differential device 24 is stored in the catch tank 56.

In the lubrication device 44a configured as described above, when the inner rotor 42a of the mechanical oil pump 42 rotates about the third rotational axis C3 with the second rotary shaft 22e rotating in one direction (positive direction) during forward travel, oil stored in the first housing space S1 of the housing case 18 is suctioned by the mechanical oil pump 42, and the oil is dispensed through the first dispensing port 46b and the second dispensing port 36c of the mechanical oil pump 42. Consequently, oil dispensed from the mechanical oil pump 42 is supplied to the second bearings 30a and 30b, the third bearing 32a, the pinion 22b of the first rotary shaft 22a, etc. of the power transfer mechanism 16 to lubricate the power transfer mechanism 16.

In the lubrication device 44a, in the case where the second rotary shaft 22e is rotated in the reverse direction during rear travel compared to during forward travel and the inner rotor 42a is rotated in reverse, that is, the mechanical oil pump 42 is rotated in reverse, the oil which is stored in the catch tank 56 is suctioned into the mechanical oil pump 42 through the second dispensing port 36c via the dispensing oil path 36d. Consequently, a situation in which no oil is supplied to the mechanical oil pump 42 can be avoided even if the inner rotor 42a of the mechanical oil pump 42 is rotated in reverse during rearward travel, and thus a seizure of the inner rotor 42a and the outer rotor 42b of the mechanical oil pump 42 can be suppressed suitably even during rearward travel. The mechanical oil pump 42 can continue suctioning the oil which is stored in the catch tank 56 since oil splashed by the differential ring gear 24c of the differential device 24 is stored in the catch tank 56 also during rearward travel. Consequently, the mechanical oil pump 42 is configured to be rotatable in reverse in the lubrication device 44a. The catch tank 56 is an example of the oil tank according to the present disclosure.

Figure 2:
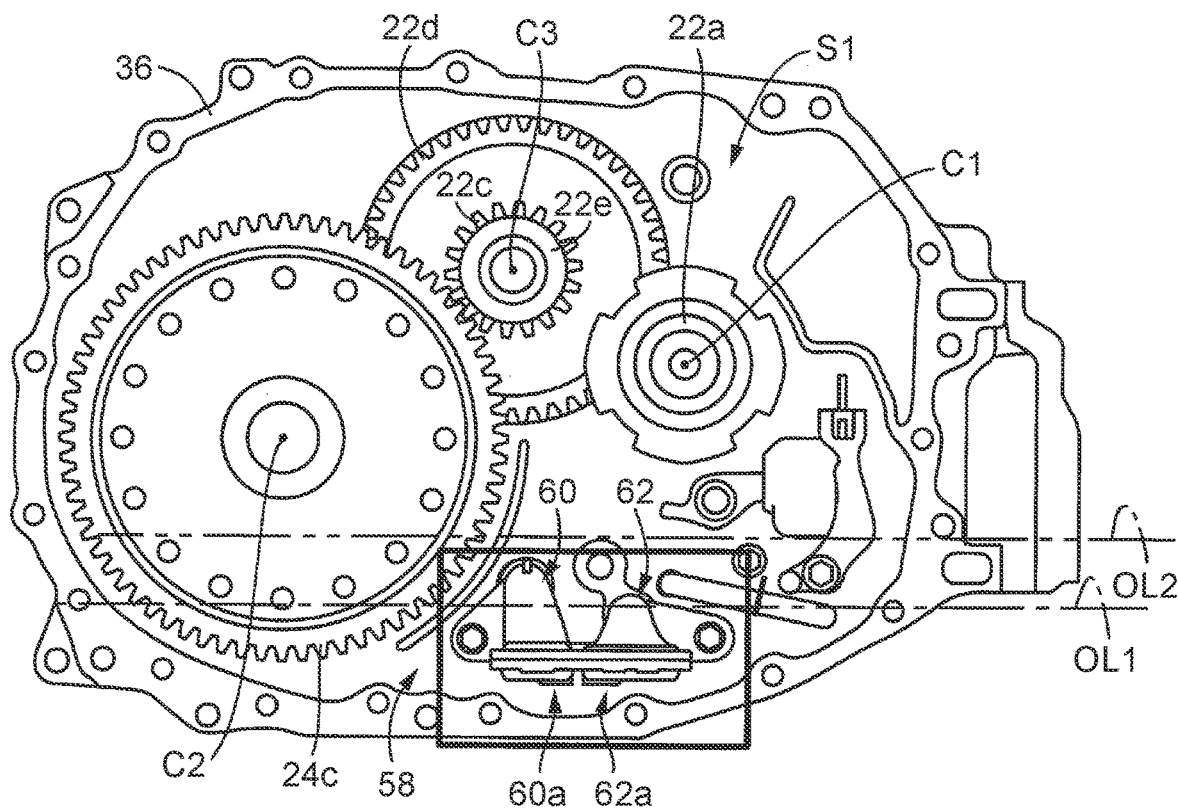
FIG. 2 illustrates a second case member in FIG. 1 as seen from the side of an electric motor in FIG. 1.

FIG. 2 illustrates the second case member 36 as seen from the side of the electric motor 12 in FIG. 1. FIG. 2 illustrates a state in which the electric vehicle 10 is located on a flat road. In FIG. 2, the upper side of the drawing sheet surface corresponds to the vertically upper side. In the first housing space S1, as illustrated in FIG. 2, an oil storage portion 58 that stores oil for lubricating the power transfer mechanism 16 and cooling the electric motor 12 is formed at the lower part, in the vertical direction, of the second case member 36. In the first housing space S1, an MOP-side strainer 60 for the mechanical oil pump 42 and an EOP-side strainer 62 for the electric oil pump 64 (see FIG. 4) are provided vertically below the second case member 36. The mechanical oil pump 42 and the electric oil pump 64 are configured to suction the oil which is stored in the oil storage portion 58 which is common.

The MOP-side strainer 60 includes an MOP-side suction opening 60a. When the mechanical oil pump 42 is driven, the oil which is stored in the oil storage portion 58 is suctioned through the MOP-side suction opening 60a. The oil which is suctioned into the MOP-side strainer 60 through the MOP-side suction opening 60a is supplied to the suction port 46a through the MOP-side suction oil path 66 (see FIG. 4). The MOP-side strainer 60 is an example of the first strainer of the mechanical oil pump according to the present disclosure. The MOP-side suction opening 60a is an example of the suction opening of the mechanical oil pump according to the present disclosure.

The EOP-side strainer 62 includes an EOP-side suction opening 62a. When the electric oil pump 64 (see FIG. 4) is driven, the oil which is stored in the oil storage portion 58 is suctioned through the EOP-side suction opening 62a. The oil which is suctioned into the EOP-side strainer 62 through the EOP-side suction opening 62a is supplied to the electric oil pump 64 through an EOP-side suction oil path 68 (see FIG. 4). The electric oil pump 64 is provided outside the second case member 36 (housing case 18). The EOP-side strainer 62 is an example of the second strainer of the electric oil pump according to the present disclosure. The EOP-side suction opening 62a is an example of the suction opening of the electric oil pump according to the present disclosure.

In FIG. 2, the long dashed short dashed line indicates a position OL1 of the oil surface of the oil which is stored in the oil storage portion 58 at the time when the vehicle is traveling, and the long dashed double-short dashed line indicates a position OL2 of the oil surface of the oil which is stored in the oil storage portion 58 at the time when the vehicle is stationary. As illustrated in FIG. 2, the MOP-side suction opening 60a and the EOP-side suction opening 62a are disposed below the positions OL1 and OL2 of the oil surface in the vertical direction both at the time when the vehicle is traveling and at the time when the vehicle is stationary. That is, the MOP-side suction opening 60a and the EOP-side suction opening 62a are always immersed in the oil which is stored in the oil storage portion 58, and thus suctioning of air through the MOP-side suction opening 60a and the EOP-side suction opening 62a is suppressed. The position OL1 of the oil surface at the time when the vehicle is traveling corresponds to the lowest position of the oil surface assumed in consideration of various traveling states of the electric vehicle 10 such as acceleration, deceleration, and turn of the vehicle.

Figure 3:
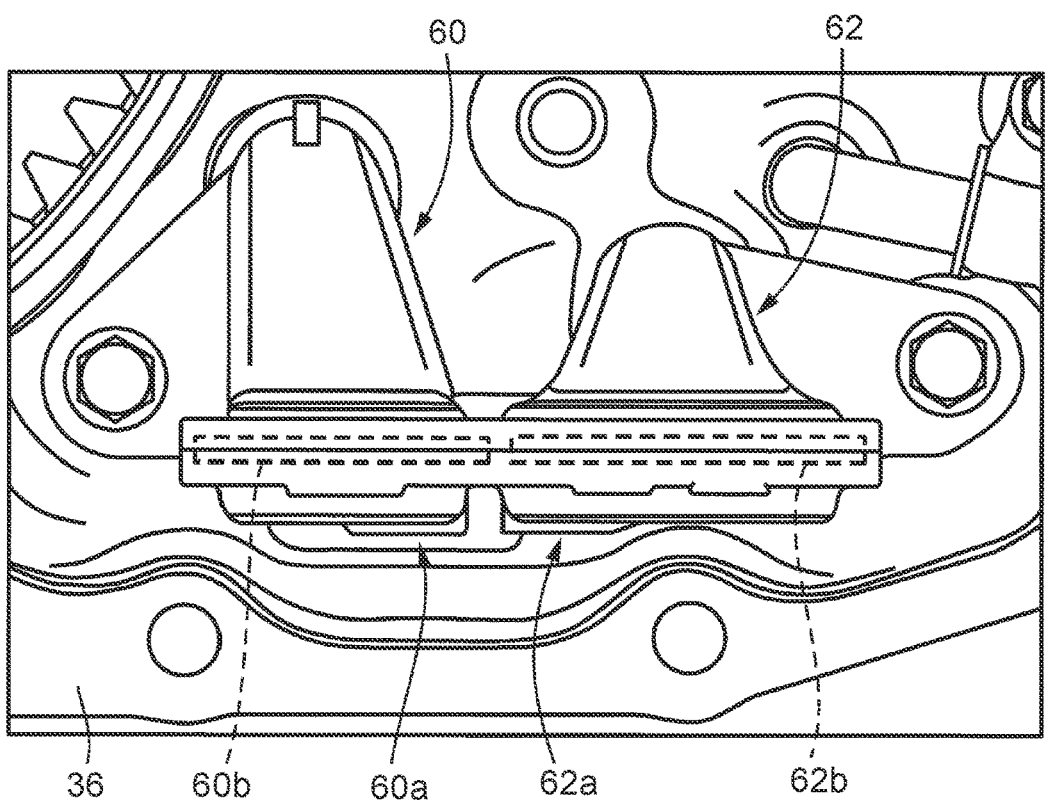
FIG. 3 is an enlarged view of a part surrounded by a rectangle in FIG. 2.

FIG. 3 is an enlarged view of a part surrounded by a rectangle in FIG. 2, specifically the MOP-side strainer 60 and the EOP-side strainer 62. An MOP-side strainer mesh 60b indicated by the dashed line is provided inside the MOP-side strainer 60. An EOP-side strainer mesh 62b indicated by the dashed line is provided inside the EOP-side strainer 62. The MOP-side strainer mesh 60b is an example of the first filtering member according to the present disclosure. The EOP-side strainer mesh 62b is an example of the second filtering member according to the present disclosure.

When the mechanical oil pump 42 is driven, the oil which is stored in the oil storage portion 58 is suctioned through the MOP-side suction opening 60a. After the oil further passes through (penetrates) the MOP-side strainer mesh 60b, the oil is supplied to the suction port 46a of the mechanical oil pump 42. In a transient period in which the oil passes through (penetrates) the MOP-side strainer mesh 60b, foreign matter such as metal powder contained in the oil adheres to the MOP-side strainer mesh 60b, which suppresses entry of the foreign matter into the mechanical oil pump 42.

When the electric oil pump 64 is driven, the oil which is stored in the oil storage portion 58 is suctioned through the EOP-side suction opening 62a. After the oil further passes through (penetrates) the EOP-side strainer mesh 62b, the oil is supplied to a suction port 64a (see FIG. 4) of the electric oil pump 64. In a transient period in which the oil passes through (penetrates) the EOP-side strainer mesh 62b, foreign matter contained in the oil adheres to the EOP-side strainer mesh 62b, which suppresses entry of the foreign matter into the electric oil pump 64.

As illustrated in FIG. 2, the MOP-side suction opening 60a and the EOP-side suction opening 62a are disposed below the position OL1 of the oil surface in the vertical direction, and disposed adjacent to each other. With the MOP-side suction opening 60a and the EOP-side suction opening 62a disposed below the position OL1 of the oil surface in the vertical direction, suctioning of air through the suction openings 60a and 62a is suppressed. With the MOP-side suction opening 60a and the EOP-side suction opening 62a disposed adjacent to each other, the MOP-side suction opening 60a and the EOP-side suction opening 62a can be disposed in a region positioned below the position OL1 of the oil surface in the vertical direction, even if the region is narrowed. Hence, it is not necessary to increase the amount of the oil which is stored in the first housing space S1, in order to suppress suctioning of air through the MOP-side suction opening 60a and the EOP-side suction opening 62a.

Figure 4:
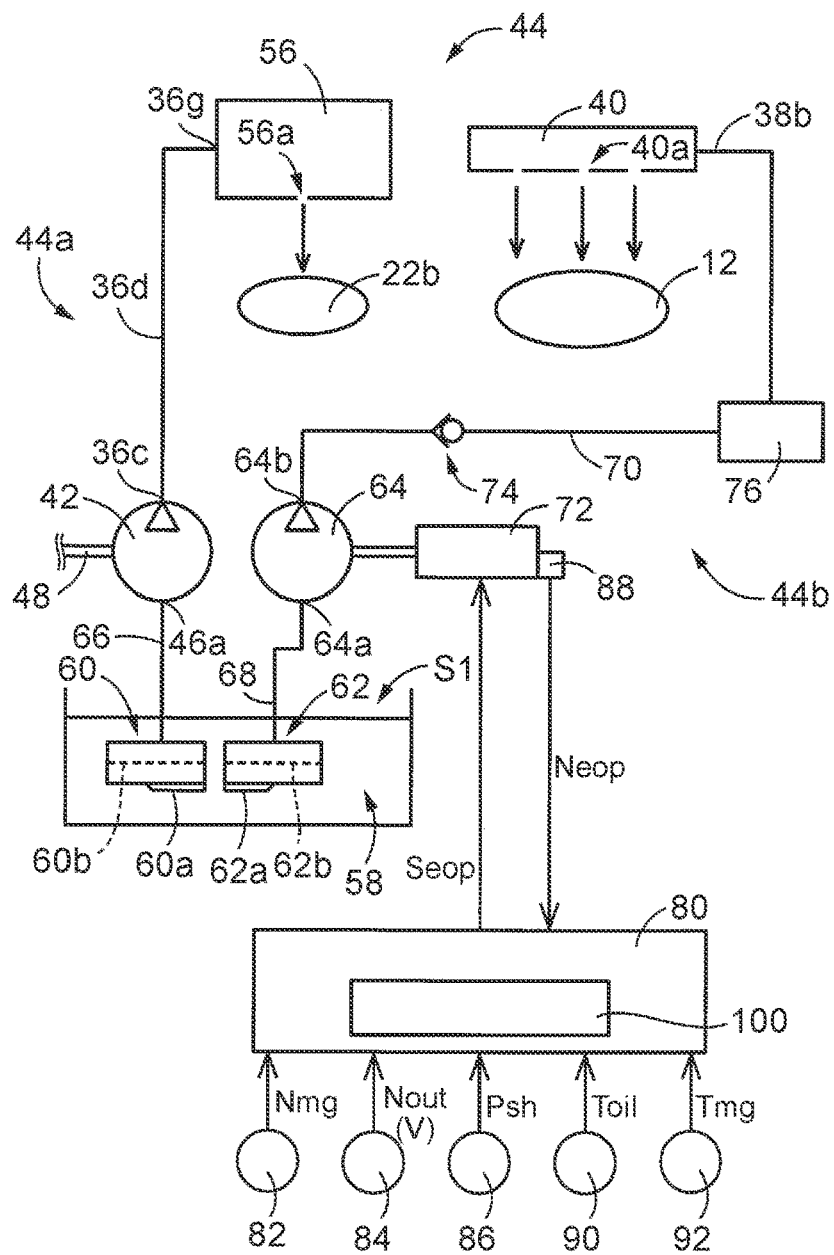
FIG. 4 briefly illustrates a lubrication cooling device illustrated in FIG. 1, and illustrates a schematic configuration of a system that controls drive of an electric oil pump.

FIG. 4 briefly illustrates the lubrication cooling device 44 illustrated in FIG. 1, and illustrates a schematic configuration of a system that controls drive of the electric oil pump 64. The lubrication cooling device 44 is configured to include the lubrication device 44a which exclusively lubricates the power transfer mechanism 16 and the cooling device 44b which exclusively cools the electric motor 12. In FIG. 4, only a device that lubricates the pinion 22b, of the lubrication device 44a in FIG. 1, is illustrated. The lubrication cooling device 44 is an example of the vehicle oil supply device according to the present disclosure.

As illustrated in FIG. 4, the lubrication device 44a is configured to include the MOP-side strainer 60, the MOP-side suction oil path 66 which couples the MOP-side strainer 60 and the suction port 46a of the mechanical oil pump 42 to each other, the mechanical oil pump 42, and the dispensing oil path 36d which couples the second dispensing port 36c of the mechanical oil pump 42 and the catch tank 56 to each other.

The cooling device 44b is configured to include the EOP-side strainer 62, the EOP-side suction oil path 68 which couples the EOP-side strainer 62 and the suction port 64a of the electric oil pump 64 to each other, the electric oil pump 64, the external conduit 70 which couples the dispensing port 64b of the electric oil pump 64 and the oil flow path 38b of the third case member 38 to each other, the oil flow path 38b, and the cooling pipe 40 which is connected to the oil flow path 38b. The external conduit 70 passes outside the housing case 18 to be connected to the oil flow path 38b. A check valve 74 that blocks reverse flow of oil and an oil cooler 76 that cools oil in the external conduit 70 are provided in the external conduit 70.

The mechanical oil pump 42 is driven by the pump drive shaft 48 as discussed above. The electric oil pump 64 is driven by a pump drive motor 72. A rotational speed Neap of the pump drive motor 72 is controlled by an electronic control device 80 to be discussed later. The electric oil pump 64 is the same in the basic structure as the mechanical oil pump 42 except for the drive force source (pump drive motor 72).

In the lubrication device 44a, when the mechanical oil pump 42 is rotated forward with the electric vehicle 10 traveling forward, the oil which is stored in the oil storage portion 58 of the first housing space S1 is suctioned through the MOP-side suction opening 60a of the MOP-side strainer 60, and the oil is dispensed to the dispensing oil path 36d through the second dispensing port 36c by way of the mechanical oil pump 42. The oil which flows through the dispensing oil path 36d is stored in the catch tank 56, and further is discharged toward the pinion 22b through the discharge opening 56a which is positioned vertically above the pinion 22b. The oil which has lubricated the pinion 22b falls vertically downward because of the gravitational force to be stored in the oil storage portion 58 again.

When the mechanical oil pump 42 is rotated in reverse, on the other hand, the oil which is stored in the catch tank 56 flows into the mechanical oil pump 42 through the second dispensing port 36c through the dispensing oil path 36d, and is dispensed to the MOP-side suction oil path 66 through the suction port 46a. The oil which is dispensed to the MOP-side suction oil path 66 flows out to the oil storage portion 58 through the MOP-side strainer 60. A seizure of gears of the mechanical oil pump 42 is suppressed since the oil which is stored in the catch tank 56 flows into the mechanical oil pump 42 in this manner. The mechanical oil pump 42 can continue suctioning the oil which in the catch tank 56 since oil splashed by the differential ring gear 24c is supplied to the catch tank 56.

In the cooling device 44b, when the electric oil pump 64 is actuated, the oil which is stored in the oil storage portion 58 is suctioned through the EOP-side suction opening 62a of the EOP-side strainer 62, and the oil is dispensed to the external conduit 70 by way of the EOP-side suction oil path 68 and the electric oil pump 64. The oil which is dispensed to the external conduit 70 is supplied to the cooling pipe 40 by way of the oil flow path 38b after being cooled by the oil cooler 76, and supplied to the electric motor 12 through the dispensing hole 40a of the cooling pipe 40. The oil which has cooled the electric motor 12 falls vertically downward because of its own weight to be stored in the oil storage portion 58 again.

The electronic control device 80 controls the drive state of the pump drive motor 72. The electronic control device 80 is configured to include a plurality of so-called microcomputers each composed of a CPU, a ROM, a RAM, and an input/output interface, and executes drive control of the pump drive motor 72 by performing signal processing in accordance with a program stored in advance in the ROM while utilizing a temporary storage function of the RAM.

The electronic control device 80 receives, as inputs, a signal that indicates a motor rotational speed Nmg (rpm) which is the rotational speed of the electric motor 12 which is detected by a motor rotational speed sensor 82, a signal that indicates an output shaft rotational speed Nout of the second rotary shaft 22e corresponding to a vehicle speed V detected by a vehicle speed sensor 84, a signal that indicates a shift operation position Psh of a shift lever (not illustrated) detected by a shift position sensor 86, a signal that indicates the rotational speed Neop of the pump drive motor 72 corresponding to the rotational speed of the electric oil pump 64 which is detected by a pump motor rotational speed sensor 88, a signal that indicates an oil temperature Toil of the oil which is stored in the oil storage portion 58 which is detected by an oil temperature sensor 90, a motor temperature Tmg of the electric motor 12 which is detected by a motor temperature sensor 92, etc. On the other hand, the electronic control device 80 outputs a motor output command signal Seop for drive control of the pump drive motor 72. The motor rotational speed sensor 82 is constituted from a resolver, and can also detect the rotational direction of the electric motor 12.

The electronic control device 80 functionally includes a controller 100 that controls the pump drive motor 72. The controller 100 is an example of the controller according to the present disclosure.

The controller 100 controls the rotational speed Neop of the pump drive motor 72 to dispense an appropriate amount of oil from the electric oil pump 64, and supplies the oil to the electric motor 12 via the cooling device 44b to cool the electric motor 12. The controller 100 controls the rotational speed Neop of the pump drive motor 72, that is, the rotational speed Neop of the electric oil pump 64, during travel of the electric vehicle 10. The controller 100 stores a relation map for determining a target rotational speed Neop* for the pump drive motor 72 defined using the motor temperature Tmg and the oil temperature Toil of the oil, for example, and determines the target rotational speed Neop* for the pump drive motor 72 by applying the motor temperature Tmg and the oil temperature Toil which are detected at appropriate times to the relation map. The controller 100 controls the rotational speed Neop of the pump drive motor 72 so as to follow the determined target rotational speed Neop*.

Figure 5:
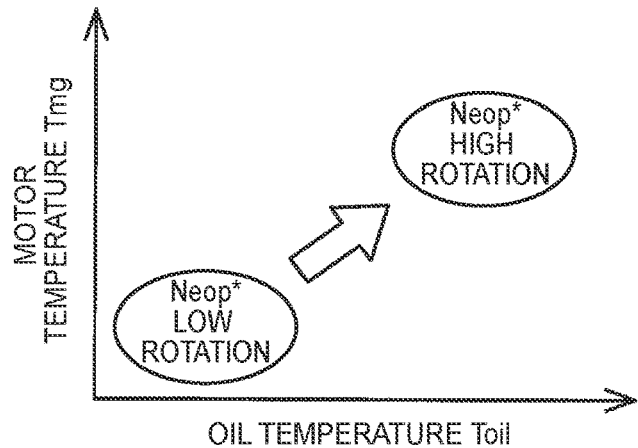
FIG. 5 is an example of a relation map for calculating a first threshold of the rotational speed of the electric oil pump.

FIG. 5 illustrates an aspect of the relation map for determining the target rotational speed Neop* for the pump drive motor 72. The relation map in FIG. 5 is obtained experimentally or through designing in advance to be stored. In FIG. 5, the horizontal axis indicates the oil temperature Toil of the oil, and the vertical axis corresponds to the motor temperature Tmg. As the motor temperature Tmg is higher, the amount of oil that is necessary to cool the electric motor 12 is increased. Thus, as illustrated in FIG. 5, the target rotational speed Neop* is set to be higher as the motor temperature Tmg is higher. As the oil temperature Toil is higher, meanwhile, the cooling performance of the oil is degraded, and thus the amount of oil that is necessary to cool the electric motor 12 is accordingly increased. Thus, as illustrated in FIG. 5, the target rotational speed Neop* is set to be higher as the oil temperature Toil is higher.

The controller 100 determines whether the mechanical oil pump 42 is rotated in reverse during travel of the electric vehicle 10. The case where the mechanical oil pump 42 is rotated in reverse specifically corresponds to the case where the electric vehicle 10 travels rearward. Consequently, the controller 100 determines that the mechanical oil pump 42 is rotated in reverse in the case where the motor rotational speed Nmg of the electric motor 12 is switched to negative rotation, that is, in the case where the electric motor 12 is rotated in the direction of rearward rotation. Alternatively, the controller 100 determines that the mechanical oil pump 42 is rotated in reverse in the case where the shift operation position Psh is switched to an R position, which is the position for rearward travel, and the vehicle speed V is equal to or more than a predetermined vehicle speed.

When the mechanical oil pump 42 is rotated in reverse, oil is dispensed from the side of the suction port 46a of the mechanical oil pump 42, and the oil passes through the MOP-side suction oil path 66 to be discharged through the MOP-side suction opening 60a. At this time, foreign matter accumulated on the MOP-side strainer mesh 60b is released, and the foreign matter is mixed in the oil which is stored in the oil storage portion 58. If the rotational speed Neop of the electric oil pump 64 is high during reverse rotation of the mechanical oil pump 42, oil containing foreign matter is suctioned through the EOP-side suction opening 62a so that the foreign matter is accumulated on the EOP-side strainer mesh 62b. Thus, the foreign matter may be partially deposited on the EOP-side strainer mesh 62b. If the foreign matter is partially deposited on the EOP-side strainer mesh 62b, the performance of the electric oil pump 64 may be lowered and, further, the load on the electric oil pump 64 may be increased to increase the amount of power consumption. In particular, the MOP-side suction opening 60a and the EOP-side suction opening 62a are disposed in proximity to each other. Thus, if the foreign matter which is accumulated on the MOP-side strainer mesh 60b is released into the oil, the oil containing the foreign matter tends to be suctioned by the electric oil pump 64, and the foreign matter tends to be partially deposited on the EOP-side strainer mesh 62b.

In order to suppress the partial deposition of the foreign matter, if it is determined that the mechanical oil pump 42 is rotated in reverse, the controller 100 restricts the rotational speed Neop of the pump drive motor 72, that is, the rotational speed Neop of the electric oil pump 64, compared to that at the time when the mechanical oil pump 42 is rotated forward. The controller 100 sets a first threshold Neop1 which is the upper limit threshold of the rotational speed Neop of the pump drive motor 72 during reverse rotation of the mechanical oil pump 42, and performs control such that the rotational speed Neop does not exceed the set first threshold Neop1.

The first threshold Neop1 is calculated experimentally or through designing in advance, and set to a value that can suppress partial deposition of the foreign matter on the EOP-side strainer mesh 62b even in the case where the mechanical oil pump 42 is rotated in reverse. The first threshold Neop1 is determined in consideration of the output shaft rotational speed Nout, the characteristics of the oil (viscosity-temperature characteristics and detergency), the mesh size of the MOP-side strainer mesh 60b, etc.

As the amount of foreign matter released from the MOP-side strainer mesh 60b is increased, foreign matter is more easily partially deposited on the EOP-side strainer mesh 62b during drive of the electric oil pump 64. In order to suppress partial deposition of the foreign matter, the first threshold Neop1 is set to a lower rotational speed as the vehicle is in a travel state in which the foreign matter which is accumulated on the MOP-side strainer mesh 60b is more easily released. The amount of foreign matter released from the MOP-side strainer mesh 60b is varied in accordance with the output shaft rotational speed Nout, the characteristics of oil, and the mesh size of the MOP-side strainer mesh 60b, etc. Thus, the first threshold Neop1 for suppressing partial deposition of the foreign matter is determined on the basis of the various specifications. Since the output shaft rotational speed Nout and the oil temperature Toil of the oil are varied in accordance with the vehicle travel state, the first threshold Neop1 is stored as a relation map obtained experimentally or through designing in advance and having the output shaft rotational speed Nout and the oil temperature Toil of the oil as parameters.

Figure 6:
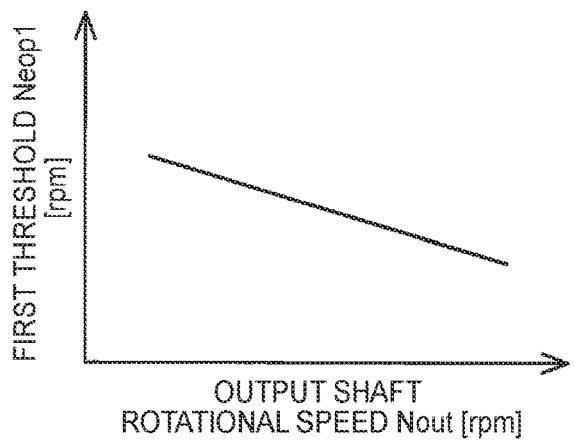
FIG. 6 is an example of a relation map for calculating a second threshold of the rotational speed of the electric oil pump.

For example, in the relation map, as indicated in FIG. 6, the first threshold Neop1 is set to a lower rotational speed as the output shaft rotational speed Nout is higher. As the output shaft rotational speed Nout is higher, the amount of oil discharged through the MOP-side suction opening 60a by the mechanical oil pump 42 is increased, the amount of oil passing through the MOP-side strainer mesh 60b is also increased, and therefore the amount of foreign matter released from the MOP-side strainer mesh 60b is also increased. However, the amount of oil suctioned through the EOP-side suction opening 62a is decreased, and the amount of foreign matter accumulated on the EOP-side strainer mesh 62b is reduced, by setting the first threshold Neop1 to a lower rotational speed as the output shaft rotational speed Nout is higher.

Also for the oil temperature Toil of the oil, a relation map is set such that the first threshold Neop1 is set to a lower rotational speed at the oil temperature Toil at which foreign matter is more easily released from the MOP-side strainer mesh 60b, in consideration of the characteristics of the oil (viscosity-temperature characteristics and detergency) at the oil temperature Toil.

The controller 100 determined the first threshold Neop1 by applying the actual output shaft rotational speed Nout, oil temperature Toil, etc. to the relation map stored in advance. The controller 100 restricts the rotational speed Neop of the pump drive motor 72 so as not to exceed the determined first threshold Neop1. Specifically, in the case where the target rotational speed Neop* for the pump drive motor 72 which is set in accordance with the relation map is more than the first threshold Neop1, the controller 100 controls the rotational speed Neop by changing the target rotational speed Neop* for the pump drive motor 72 to the first threshold Neop1. In the case where the target rotational speed Neop* for the pump drive motor 72 is equal to or less than the first threshold Neop1, on the other hand, the controller 100 controls the rotational speed Neop to the target rotational speed Neop*. In this manner, the amount of foreign matter accumulated on the EOP-side strainer mesh 62b of the electric oil pump 64 is reduced, even in the case where the mechanical oil pump 42 is rotated in reverse, with the target rotational speed Neop* for the pump drive motor 72 restricted so as not to exceed the first threshold Neop1 in the case where the mechanical oil pump 42 is rotated in reverse.

When the rotational speed Neop of the pump drive motor 72 is restricted, the cooling performance of the electric motor 12 is lowered, and therefore the motor temperature Tmg of the electric motor 12 tends to be raised. In the case where the motor temperature Tmg of the electric motor 12 is equal to or more than a predetermined temperature Tlim in the vicinity of a high temperature threshold Tmax for the electric motor 12 set in advance, the controller 100 restricts the rotational speed Neop of the electric oil pump 64 such that the rotational speed Neop of the pump drive motor 72 is not more than a second threshold Neop2 set to be larger than the first threshold Neop1. The high temperature threshold Tmax is set as a threshold at which an output of the electric motor 12 is restricted with the electric motor 12 at a high temperature, for example.

The second threshold Neop2 is calculated experimentally or through designing in advance, and set to a value that secures the cooling properties of the electric motor 12 while reducing the amount of foreign matter accumulated on the EOP-side strainer mesh 62b of the electric oil pump 64. When compared to the first threshold Neop1 which is prescribed using the relation map for calculating the first threshold Neop1, the second threshold Neop2 has a value that is higher than the first threshold Neop1 by an amount for consideration of cooling of the electric motor 12 under the same condition in the relation map. When compared to the target rotational speed Neop* which is set when the mechanical oil pump 42 is rotated forward, on the other hand, the second threshold Neop2 has a value that is lower than the target rotational speed Neop*.

The second threshold Neop2, which improves the cooling properties of the electric motor 12, is prescribed using a relation map defined using the oil temperature Toil of the oil and the motor temperature Tmg, as with the relation map for calculating the target rotational speed Neop* illustrated in FIG. 5. The target rotational speed Neop* which is set when the mechanical oil pump 42 is rotated forward is set with a margin so as to secure sufficient cooling properties of the electric motor 12. Therefore, the second threshold Neop2 is set to a value that is lower than the target rotational speed Neop* (Neop*>Neop2) under the same condition in the relation map. In the relation map for the second threshold Neop2, as in the relation map in FIG. 5, the second threshold Neop2 is set to be higher as the motor temperature Tmg is higher, and set to be higher as the oil temperature Toil of the oil is higher.

The controller 100 sets the second threshold Neop2 on the basis of the relation map for calculating the second threshold Neop2, and restricts the rotational speed Neop of the pump drive motor 72 such that the rotational speed Neop of the pump drive motor 72 does not exceed the set second threshold Neop2. As discussed above, the second threshold Neop2 has a value that is lower than the target rotational speed Neop*, and therefore the controller 100 actually controls the rotational speed of the pump drive motor 72 using the second threshold Neop2 as the target value.

As described above, the amount of foreign matter accumulated on the EOP-side strainer mesh 62b is reduced with the amount of oil suctioned through the EOP-side suction opening 62a decreased with the rotational speed Neop of the pump drive motor 72 restricted so as not to exceed the first threshold Neop1 in the case where the mechanical oil pump 42 is rotated in reverse. Hence, partial deposition of the foreign matter on the EOP-side strainer mesh 62b is suppressed. With the rotational speed Neop of the pump drive motor 72 restricted so as not to exceed the first threshold Neop1, the rotational speed Neop of the electric oil pump 64 is restricted so as not to exceed the second threshold Neop2 in the case where the motor temperature Tmg of the electric motor 12 reaches the predetermined temperature Tlim. The second threshold Neop2 is set to a value that is larger than the first threshold Neop1. Consequently, when the motor temperature Tmg is equal to or more than the predetermined temperature Tlim, the rotational speed Neop of the electric oil pump 64 is raised, and the amount of oil dispensed from the electric oil pump 64 is increased. Therefore, the cooling properties of the electric motor 12 are improved, and the electric motor 12 is prevented from reaching a high temperature.

When the electric vehicle 10 is switched from rearward travel to forward travel, that is, the mechanical oil pump 42 is switched from reverse rotation to forward rotation, the controller 100 finishes restricting the rotational speed Neop of the electric oil pump 64, and controls the pump drive motor 72 to the target rotational speed Neop* which is set during forward rotation of the mechanical oil pump 42.

Even in the case where the rotational speed Neop of the pump drive motor 72 is restricted during reverse rotation of the mechanical oil pump 42, a part of foreign matter accumulated on the MOP-side strainer mesh 60b may be moved toward the EOP-side strainer mesh 62b. Thus, in order to further resolve partial deposition of the foreign matter, the controller 100 maintains the restriction on the rotational speed Neop until a predetermined time L elapses since the mechanical oil pump is switched to forward rotation. Consequently, the rotational speed Neop of the electric oil pump 64 is continuously restricted until the predetermined time L elapses. Therefore, oil is positively suctioned through the MOP-side suction opening 60a of the mechanical oil pump 42, and foreign matter is accumulated on the side of the MOP-side strainer mesh 60b, until the predetermined time L elapses. Thus, foreign matter released from the MOP-side strainer mesh 60b during reverse rotation of the mechanical oil pump 42 is accumulated on the MOP-side strainer mesh 60b again. Hence, partial deposition of the foreign matter is further suppressed. The predetermined time L is calculated experimentally or through designing in advance, and set to a value with which foreign matter released from the MOP-side strainer mesh 60b during reverse rotation of the mechanical oil pump 42 is accumulated on the MOP-side strainer mesh 60b again. The predetermined time L may be changed, as appropriate, in accordance with the oil temperature Toil of the oil, the output shaft rotational speed Nout, etc.

Figure 7:
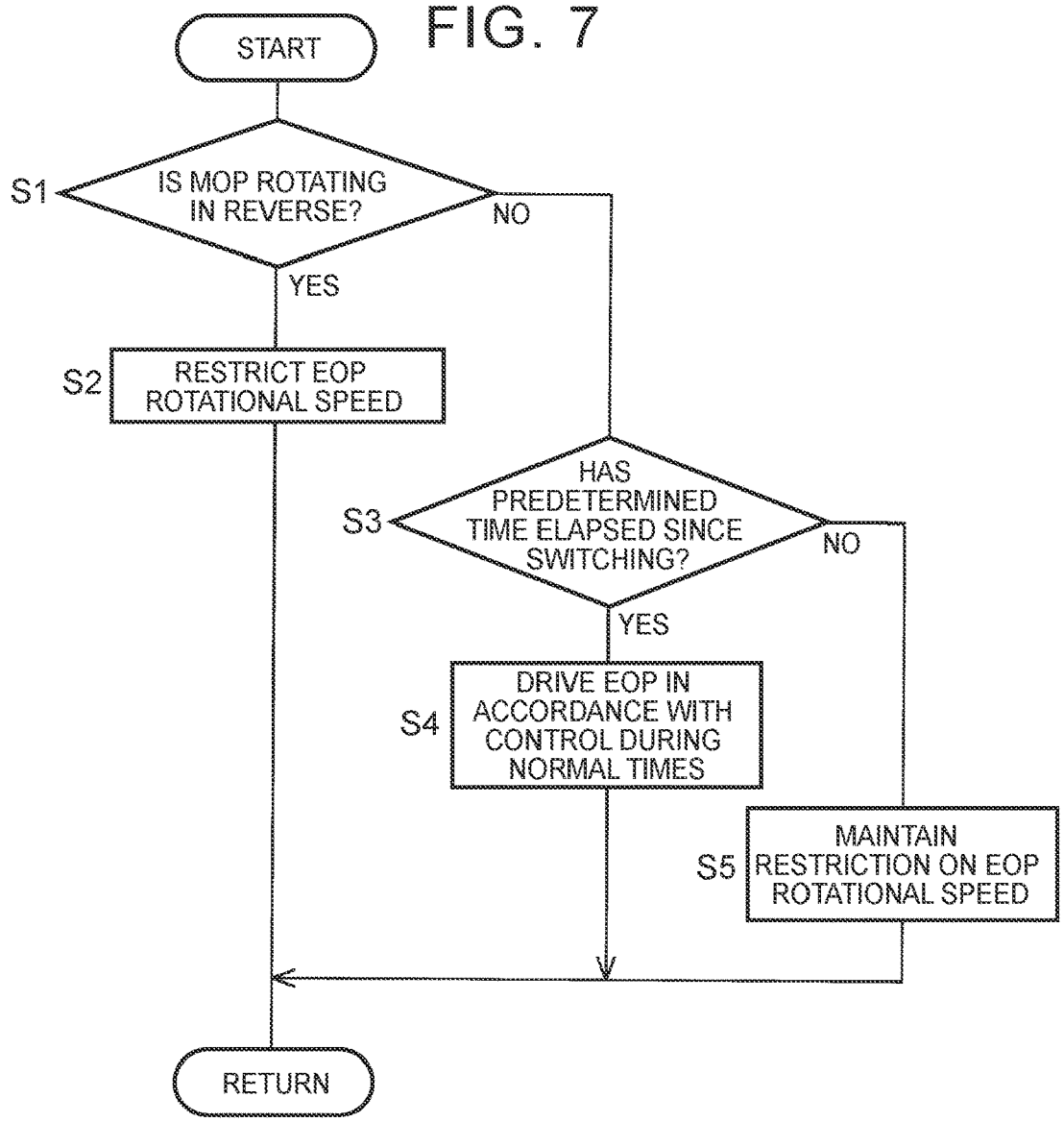
FIG. 7 is a flowchart illustrating an essential portion of control operation of an electronic control device in FIG. 4.

FIG. 7 is a flowchart illustrating an essential portion of control operation of the electronic control device 80. The flowchart is repeatedly executed during travel of the electric vehicle 10. Steps S1 to S5 indicated in FIG. 7 correspond to the control function of the controller 100. The electronic control device 80 is an example of the control device according to the present disclosure.

First, it is determined in step S1 (hereinafter the word "step" is omitted) whether the mechanical oil pump 42 is rotating in reverse. In the case where the mechanical oil pump 42 is rotating in reverse, the determination in S1 is affirmed, and the upper limit of the rotational speed Neop of the pump drive motor 72 is restricted to the first threshold Neop1 in S2. Specifically, the first threshold Neop1 of the rotational speed Neop of the pump drive motor 72 is set, and the rotational speed Neop is controlled so as not to exceed the first threshold Neop1. With the rotational speed Neop of the pump drive motor 72 restricted, the rotational speed Neop of the pump drive motor 72 is restricted so as not to exceed the second threshold Neop2 in the case where the motor temperature Tmg of the electric motor 12 is equal to or more than the predetermined temperature Tlim. The second threshold Neop2 is set to a value that is larger than the first threshold Neop1.

Returning to S1, the determination in S1 is denied in the case where the mechanical oil pump 42 is rotating forward, that is, while the electric vehicle 10 is traveling forward, and it is determined in S3 whether the predetermined time L has elapsed since the time when the mechanical oil pump 42 was switched to forward rotation. The determination in S3 is denied in the case where the predetermined time L has not elapsed since the switching, and the process is returned with the restriction on the rotational speed Neop maintained in S5. In the case where the predetermined time L has elapsed since the switching of the mechanical oil pump 42 to forward rotation in S3, on the other hand, the determination in S3 is affirmed, and the pump drive motor 72 is driven in accordance with control during normal times, that is, control during forward rotation of the mechanical oil pump 42 in S4. Specifically, the rotational speed Neop of the pump drive motor 72 is controlled to the target rotational speed Neop* which is determined by applying the actual motor temperature Tmg and oil temperature Toil of the oil to the relation map for determining the target rotational speed Neop* for the pump drive motor 72 which is defined using the motor temperature Tmg and the oil temperature Toil of the oil.

As discussed above, with the first embodiment, partial deposition of foreign matter on each of the strainer meshes 60b and 62b is suppressed with the amount of foreign matter accumulated on the EOP-side strainer mesh 62b on the side of the electric oil pump 64 reduced with the rotational speed Neop of the electric oil pump 64 restricted even in the case where the mechanical oil pump 42 is rotated in reverse. Thus, a reduction in the performance of the electric oil pump 64 is suppressed.

Next, a second embodiment of the present disclosure will be described. In the following description, portions that are the same as those according to the first embodiment discussed earlier are given the same reference numerals to omit description.

Figure 8:
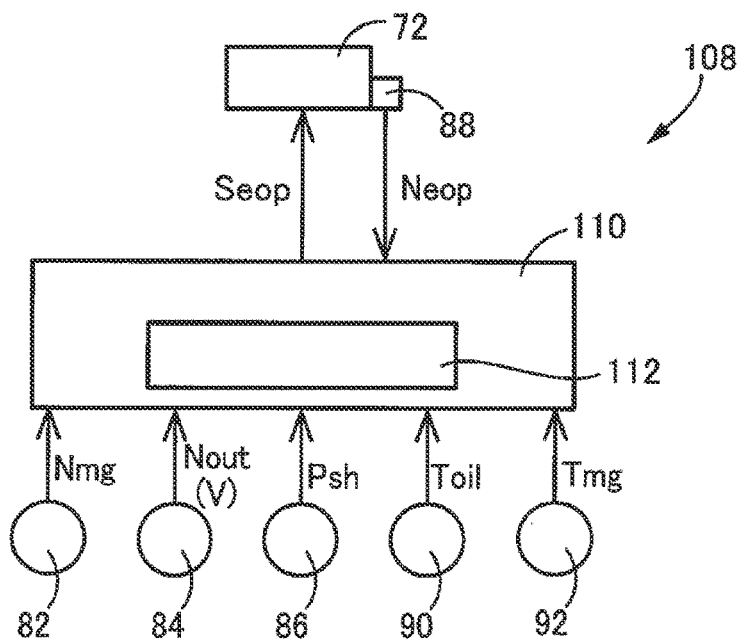
FIG. 8 illustrates a schematic configuration of a system that controls drive of an electric oil pump corresponding to a control device for a vehicle oil supply device according to a second embodiment of the present disclosure.

FIG. 8 illustrates a schematic configuration of a part of a lubrication cooling device 108 according to the second embodiment of the present disclosure, in particular a system that controls drive of an electric oil pump 64. The structure of the lubrication cooling device 108 is the same as that according to the first embodiment discussed earlier, and therefore is not described.

The electronic control device 110 functionally includes a controller 112 that controls the pump drive motor 72. The controller 112 is an example of the controller according to the present disclosure.

The basic control function of the controller 112 is the same as that of the controller 100 according to the first embodiment discussed earlier. Specifically, the controller 112 determines the target rotational speed Neop* for the pump drive motor 72 from a relation map set in advance, and controls the rotational speed Neop* of the pump drive motor 72 to the determined target rotational speed Neop*.

The controller 112 stops the electric oil pump 64 in the case where the mechanical oil pump 42 is rotated in reverse. That is, in the case where the mechanical oil pump 42 is rotated in reverse, the controller 112 restricts the rotational speed Neop of the electric oil pump 64 to zero. When the electric oil pump 64 is stopped, oil is not suctioned through the EOP-side suction opening 62a, and therefore partial deposition of foreign matter on the EOP-side strainer mesh 62b is effectively suppressed.

When the electric oil pump 64 is stopped, meanwhile, oil is not supplied to the electric motor 12, and therefore the motor temperature Tmg of the electric motor 12 is easily raised compared to the first embodiment discussed earlier. In the case where the motor temperature Tmg of the electric motor 12 is equal to or more than the predetermined temperature Tlim, the controller 112 sets the second threshold Neop2 which is the upper limit threshold of the rotational speed Neop of the pump drive motor 72, and restricts the rotational speed Neop of the pump drive motor 72 so as not to exceed the second threshold Neop2, as in the first embodiment discussed earlier. The second threshold Neop2 is set in the same manner as in the first embodiment discussed earlier, and has a value that is lower than the target rotational speed Neop* which is set when the mechanical oil pump 42 is rotated forward. Thus, in reality, the controller 112 controls the rotational speed Neop of the pump drive motor 72 using the second threshold Neop2 as the target value.

As discussed above, in the second embodiment, in the case where the mechanical oil pump 42 is rotated in reverse, the electric oil pump 64 is stopped, which effectively suppresses partial deposition of foreign matter on the EOP-side strainer mesh 62b. In the case where the motor temperature Tmg is equal to or more than the predetermined temperature Tlim since the electric oil pump 64 is stopped, the rotational speed Neop of the pump drive motor 72 is controlled so as not to exceed the second threshold Neop2, which secures the cooling properties of the electric motor 12 and prevents the electric motor 12 from reaching a high temperature. Hence, the same effect as the first embodiment discussed earlier can be obtained also with the second embodiment.

Figure 9:
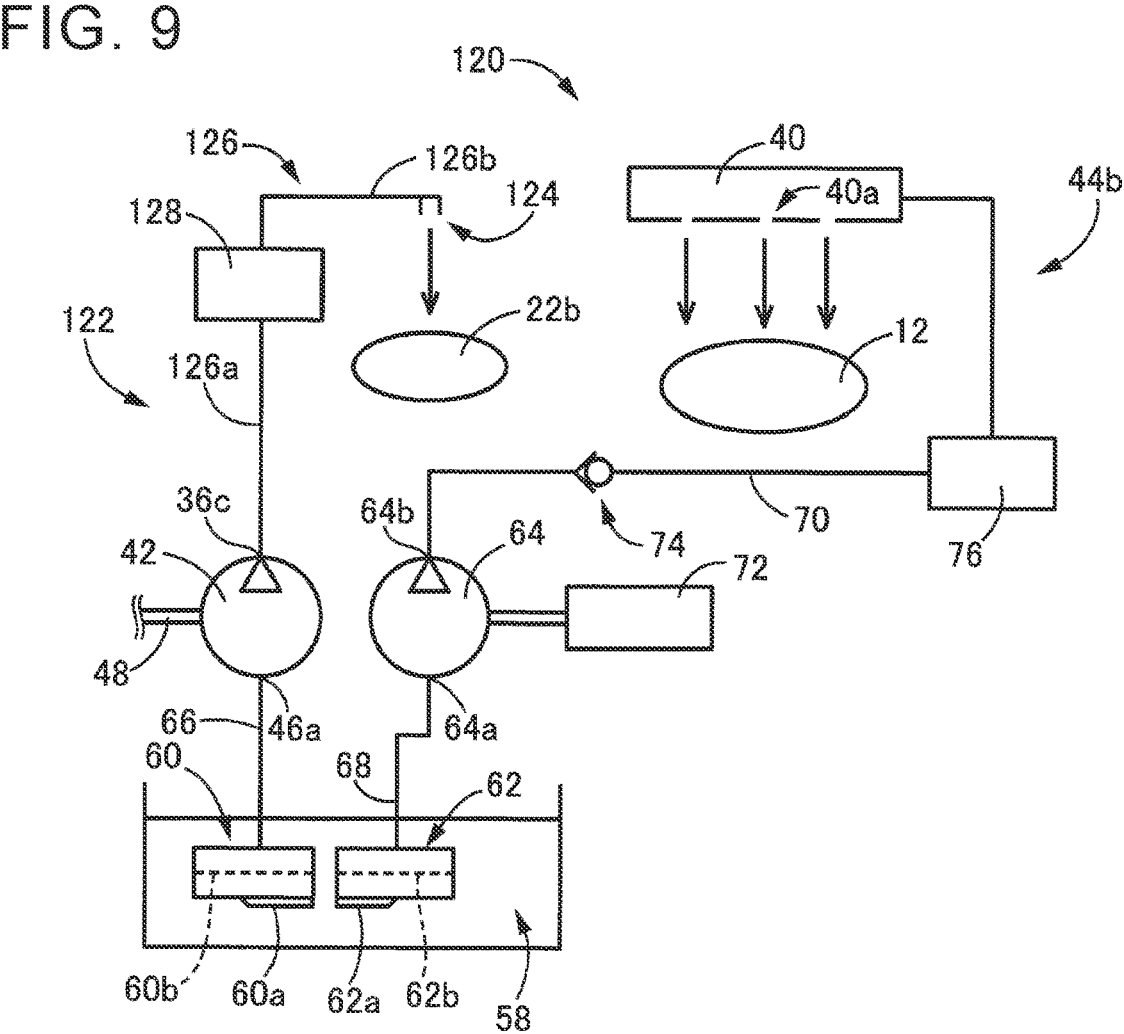
FIG. 9 briefly illustrates a lubrication cooling device corresponding to a control device for a vehicle oil supply device according to a third embodiment of the present disclosure.

FIG. 9 schematically illustrates a lubrication cooling device 120 according to a third embodiment of the present disclosure. The lubrication cooling device 120 is configured to include a lubrication device 122 and the cooling device 44b. The cooling device 44b is the same as that according to the first and second embodiments discussed earlier, and thus given the same reference numerals to omit description. The lubrication cooling device 120 is an example of the oil supply device according to the present disclosure.

The lubrication device 122 includes the MOP-side strainer 60, the MOP-side suction oil path 66 which couples the MOP-side strainer 60 and the suction port 46a of the mechanical oil pump 42 to each other, the mechanical oil pump 42, an external conduit 126 that couples the second dispensing port 36c of the mechanical oil pump 42 and a discharge opening 124 to each other, and an oil cooler 128 provided in the external conduit 126.

The external conduit 126 is composed of a first oil path 126a that couples the mechanical oil pump 42 and the oil cooler 128 to each other and a second oil path 126b that couples the oil cooler 128 and the discharge opening 124 to each other. The first oil path 126a penetrates the housing case 18 and extends to the outside to be connected to the oil cooler 128 which is provided outside the housing case 18. The second oil path 126b is connected to the discharge opening 124 with one end of the second oil path 126b connected to the output side of the oil cooler 128 and with the other end penetrating the housing case 18 and extending into the housing case 18.

With the lubrication device 122 configured as described above, when the mechanical oil pump 42 is rotated forward, the oil which is stored in the oil storage portion 58 is suctioned through the MOP-side suction opening 60a of the MOP-side strainer 60, and the oil is dispensed to the first oil path 126a by way of the mechanical oil pump 42. The oil which is dispensed to the first oil path 126a flows into the oil cooler 128 to be cooled by the oil cooler 128, and thereafter is dispensed to the second oil path 126b. The oil which is dispensed to the second oil path 126b is discharged through the discharge opening 124 to be supplied to the pinion 22b.

When the mechanical oil pump 42 is rotated in reverse, on the other hand, the oil which flows in the oil cooler 128 and the external conduit 126 flows into the mechanical oil pump 42 through the second dispensing port 36c of the mechanical oil pump 42 to be dispensed through the suction port 46a. A large portion of the external conduit 126 is disposed outside the housing case 18, which can enhance the degree of freedom in the arrangement of the oil paths and increase the length of the oil paths. The oil path which is provided inside the oil cooler 128 and through which the oil passes is long in order to cool the oil. Consequently, sufficient oil that flows in the external conduit 126 and the oil cooler 128 is secured, which suppresses a seizure of gears of the mechanical oil pump 42 with oil supplied to the mechanical oil pump 42 even in the case where the mechanical oil pump 42 is rotated in reverse. Hence, the mechanical oil pump 42 is rotatable in reverse also in the lubrication device 122.

The length of the external conduit 126 and the length of the oil path in the oil cooler 128 are set to such values that the oil to be suctioned into the mechanical oil pump 42 is not exhausted even if the mechanical oil pump 42 is rotated in reverse in consideration of the amount of oil assumed to be suctioned into the mechanical oil pump 42 when the mechanical oil pump 42 is rotated in reverse, the time (lapse of time) for which the mechanical oil pump 42 is rotated in reverse, etc.

In the lubrication device 122, a catch tank 56 such as that according to the first embodiment discussed earlier can be further added to one of the first oil path 126a and the second oil path 126b. With the catch tank 56 further added, a seizure of gears of the mechanical oil pump 42 is suppressed with oil to be suctioned into the mechanical oil pump 42 secured even in the case where the mechanical oil pump 42 is rotated in reverse for a long time.

As discussed above, also with the lubrication cooling device 120 according to the third embodiment, the mechanical oil pump 42 is rotatable in reverse. Thus, the same effect as the first embodiment discussed earlier is obtained with the rotational speed Neop of the electric oil pump 64 restricted when the mechanical oil pump 42 is rotated in reverse. The specific aspect of control is the same as that according to the first embodiment discussed earlier, and therefore is not described.

Figure 10:
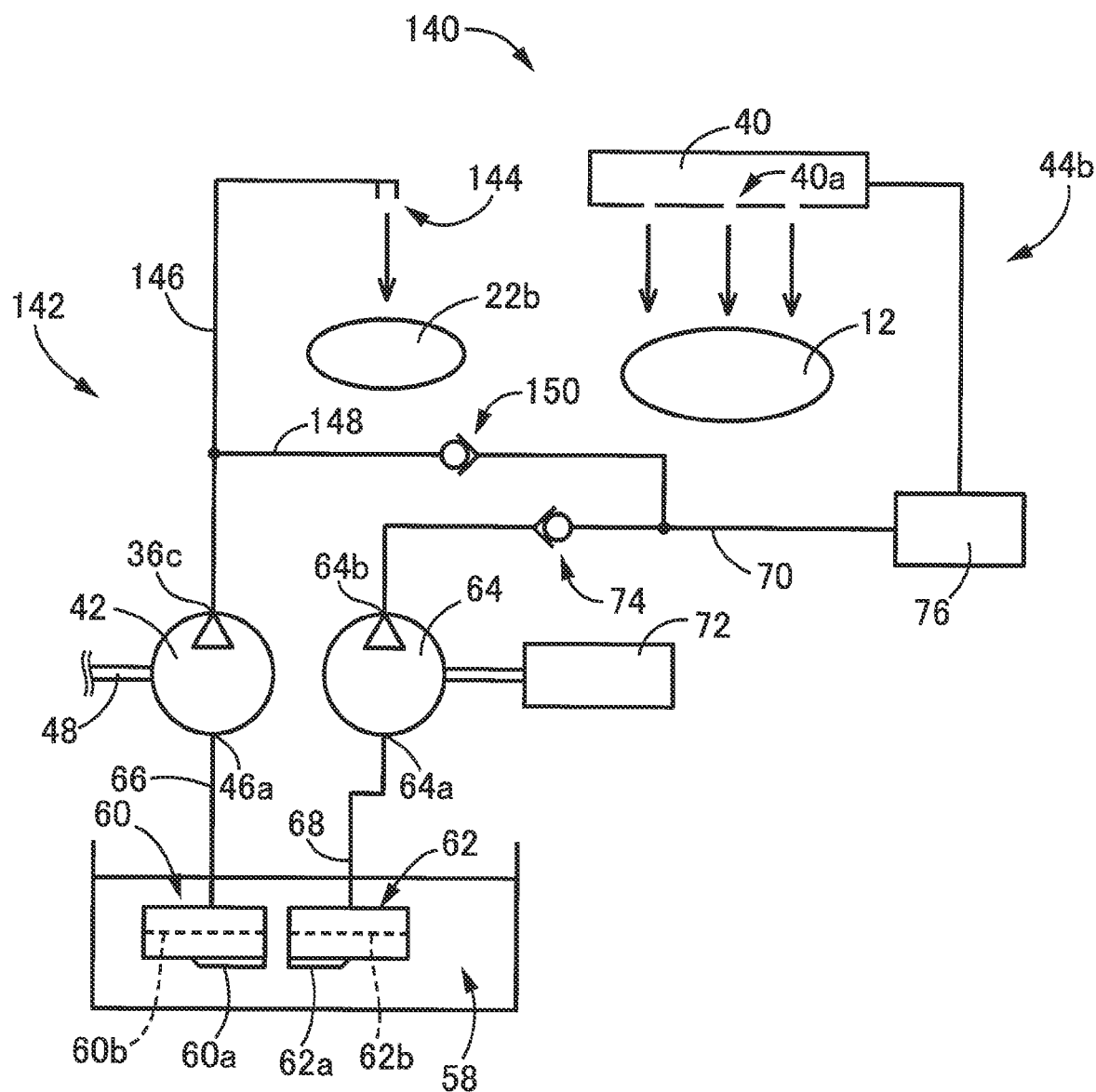
FIG. 10 briefly illustrates a lubrication cooling device corresponding to a control device for a vehicle oil supply device according to a fourth embodiment of the present disclosure.

FIG. 10 schematically illustrates a lubrication cooling device 140 according to a fourth embodiment of the present disclosure. The lubrication cooling device 140 is configured to include a lubrication device 142 and the cooling device 44b. The cooling device 44b is basically the same as that according to the first to third embodiments discussed earlier, and thus given the same reference numerals to omit description. The lubrication cooling device 140 is an example of the oil supply device according to the present disclosure.

The lubrication device 142 includes the MOP-side strainer 60, the MOP-side suction oil path 66 which couples the MOP-side strainer 60 and the suction port 46a of the mechanical oil pump 42 to each other, the mechanical oil pump 42, and a dispensing oil path 146 that couples the second dispensing port 36c of the mechanical oil pump 42 and a discharge opening 144 to each other.

The lubrication cooling device 140 is provided with a bypass oil path 148 that connects between the dispensing oil path 146 of the lubrication device 142 and the external conduit 70 of the cooling device 44b. The bypass oil path 148 is provided with a check valve 150 that blocks a flow of oil from the dispensing oil path 146 to the external conduit 70 while permitting a flow of oil from the external conduit 70 to the dispensing oil path 146. The bypass oil path 148 is an example of the oil path according to the present disclosure.

With the bypass oil path 148 and the check valve 150 provided, when the mechanical oil pump 42 is rotated in reverse, a part of oil dispensed from the electric oil pump 64 is supplied to the mechanical oil pump 42 through the bypass oil path 148. Consequently, a seizure of gears of the mechanical oil pump 42 is suppressed with a part of oil dispensed from the electric oil pump 64 continuously supplied to the mechanical oil pump 42 during reverse rotation of the mechanical oil pump 42. Hence, the mechanical oil pump 42 is rotatable in reverse also in the lubrication cooling device 140.

As discussed above, also with the lubrication cooling device 140 according to the fourth embodiment, the mechanical oil pump 42 is rotatable in reverse. Thus, the same effect as the first embodiment discussed earlier is obtained with the rotational speed Neop of the electric oil pump 64 restricted in the case where the mechanical oil pump 42 is rotated in reverse. The specific aspect of control is the same as that according to the first embodiment discussed earlier, and therefore is not described.

While the first to fourth embodiments of the present disclosure have been described in detail above with reference to the drawings, the present disclosure is also applicable to other aspects as modifications.

A first modification is described first. In the first embodiment discussed earlier, the rotational speed Neop of the electric oil pump 64 is restricted by setting the first threshold Neop1 of the rotational speed Neop of the electric oil pump 64 when the mechanical oil pump 42 is rotated in reverse. However, the present disclosure is not necessarily limited thereto. For example, the controller 100 stores a relation map for determining the target rotational speed Neop* for the pump drive motor 72 to be applied when the mechanical oil pump 42 is rotated in reverse, separately from the relation map for use when the mechanical oil pump 42 is rotated forward, and the target rotational speed Neop* is set on the basis of the relation map when the mechanical oil pump 42 is rotated in reverse. The target rotational speed Neop* is set to a low rotational speed in the relation map to be applied when the mechanical oil pump 42 is rotated in reverse compared to the relation map to be applied when the mechanical oil pump 42 is rotated forward, and thus rotational speed of the electric oil pump 64 is restricted when the mechanical oil pump 42 is rotated in reverse compared to when the mechanical oil pump 42 is rotated forward. The rotational speed Neop of the electric oil pump 64 may be restricted by switching the relation map for determining the target rotational speed Neop* between when the mechanical oil pump 42 is rotated forward and when the mechanical oil pump 42 is rotated in reverse in this manner.

A second modification is described next. In the first embodiment discussed earlier, the first threshold Neop1 of the rotational speed Neop of the electric oil pump 64 is set on the basis of the output shaft rotational speed Nout and the oil temperature Toil. However, the first threshold Neop1 may be set on the basis of one of the output shaft rotational speed Nout and the oil temperature Toil.

A third modification is described next. In the first, third, and fourth embodiments discussed earlier, the mechanical oil pump 42 is made rotatable in reverse by providing the catch tank 56 in the dispensing oil path 36*d* for the mechanical oil pump 42, providing the external conduit 126 for the mechanical oil pump 42 and providing the oil cooler 128, and providing the bypass oil path 148 between the mechanical oil pump 42 and the electric oil pump 64, respectively, for example. However, the configuration which makes the mechanical oil pump 42 rotatable in reverse is not necessarily limited thereto. For example, the present disclosure may be applied, as appropriate, to any configuration in which the mechanical oil pump 42 is rotatable in reverse, such as a configuration in which gears of the mechanical oil pump 42 are disposed to be always immersed in the oil which is stored in the first housing space S1.

A fourth modification is described next. In the first embodiment discussed earlier, the rotational speed Neop of the electric oil pump 64 is restricted until the predetermined time L elapses after the mechanical oil pump 42 is switched to forward rotation. However, the restriction on the rotational speed Neop of the electric oil pump 64 may be removed instantly when the mechanical oil pump 42 is switched to forward rotation.

A fifth modification is described next. In the embodiments discussed earlier, the second threshold Neop2 of the rotational speed Neop of the electric oil pump 64 is set on the basis of the oil temperature Toil of the oil and the motor temperature Tmg. However, the second threshold Neop2 may be set on the basis of one of the oil temperature Toil and the motor temperature Tmg. Alternatively, the second threshold Neop2 may be set on the basis of the time which has elapsed since the mechanical oil pump 42 started reverse rotation, in addition to the oil temperature Toil and the motor temperature Tmg.

A sixth modification is described next. In the embodiments discussed earlier, the rotational speed Neop of the pump drive motor 72 is controlled using the second threshold Neop2 as the target value when the electric motor 12 reaches the predetermined temperature Tlirn or more. However, the rotational speed Neop of the pump drive motor 72 may be controlled to the target rotational speed Neop*, which is set during forward rotation of the mechanical oil pump 42, when the electric motor 12 reaches the predetermined temperature Tlim or more.

A seventh modification is described next. In the embodiment discussed earlier, the bypass oil path 148 is provided between the dispensing oil path 146 and the external conduit 70 in the lubrication cooling device 140. However, an orifice may be provided between the dispensing oil path 146 and the external conduit 70.

An eighth modification is described next. In the embodiments discussed earlier, oil dispensed from the mechanical oil pump 42 is supplied exclusively to the power transfer mechanism 16, and oil dispensed from the electric oil pump 64 is supplied exclusively to the electric motor 12. However, the present disclosure is not necessarily limited thereto. For example, a part of oil dispensed from the mechanical oil pump 42 may be supplied to the electric motor 12, and a part of oil dispensed from the electric oil pump 64 may be supplied to the power transfer mechanism 16. In short, the present disclosure may be applied to any configuration in which the electric motor 12 is cooled using oil dispensed at least from the electric oil pump 64.

A ninth modification is described next. In the embodiments discussed earlier, the MOP-side suction opening 60*a* of the MOP-side strainer 60 of the mechanical oil pump 42 and the EOP-side suction opening 62*a* of the EOP-side strainer 62 of the electric oil pump 64 are provided separately. However, the MOP-side suction opening 60*a* and the EOP-side suction opening 62*a* may be constituted as a common suction opening. That is, the present disclosure may be applied to any configuration in which the MOP-side strainer mesh 60*b* and the EOP-side strainer mesh 62*b* are provided separately even if the suction opening is common.

A tenth modification is described next. The lubrication device 122 according to the embodiment discussed earlier may not include the oil cooler 128. In this case, the external conduit 126 is set to such an appropriate length that oil to be suctioned into the mechanical oil pump 42 when the mechanical oil pump 42 is rotated in reverse is secured, that is, that the mechanical oil pump 42 is rotatable in reverse.

An eleventh modification is described next. In the embodiment discussed earlier, the catch tank 56 is configured to store oil splashed by the differential ring gear 24*c*. However, the present disclosure is not necessarily limited to a structure in which oil splashed by the differential ring gear 24*c* is stored. For example, the present disclosure may also be applied to a sealed structure in which the catch tank 56 stores only oil dispensed from the mechanical oil pump 42.

The present disclosure is not necessarily limited to the electric vehicle 10. In the embodiments and the modifications, the present disclosure may be applied, as appropriate, to any type of vehicles that do not cause any contradiction, such as hybrid vehicles that include an engine and an electric motor as drive force sources, for example.

The above discussion merely introduces embodiments, and the present disclosure can be implemented in aspects in which a variety of modifications and improvements are made on the basis of the knowledge of a person skilled in the art.

What is claimed is:

1. A control device for a vehicle oil supply device, the vehicle oil supply device including:
   a mechanical oil pump configured to be rotatable forward and in reverse;
   an electric oil pump configured to suction oil stored in an oil storage portion common to the mechanical oil pump;
   a first filtering member provided to a first strainer of the mechanical oil pump; and
   a second filtering member provided to a second strainer of the electric oil pump,
   the control device comprising a controller configured to control a rotational speed of the electric oil pump, the controller being configured to restrict the rotational speed of the electric oil pump when the mechanical oil pump is rotated in reverse compared to when the mechanical oil pump is rotated forward.

2. The control device according to claim 1, wherein the controller is configured to restrict the rotational speed of the electric oil pump such that the rotational speed of the electric oil pump does not exceed a first threshold when the mechanical oil pump is rotated in reverse.

3. The control device according to claim 2, wherein the controller is configured to restrict the rotational speed of the electric oil pump such that the rotational speed of the electric oil pump does not exceed a second threshold when a temperature of an electric motor cooled by oil dispensed at least from the electric oil pump is equal to or more than a predetermined temperature set in advance, the second threshold being set to a value that is larger than the first threshold.

4. The control device according to claim 2, wherein the controller is configured to restrict the rotational speed of the electric oil pump such that the rotational speed of the electric oil pump does not exceed a second threshold when a temperature of oil dispensed at least from the electric oil pump is equal to or more than a predetermined temperature set in advance, the second threshold being set to a value that is larger than the first threshold.

5. The control device according to claim 1, wherein the controller is configured to cancel restriction on the rotational speed of the electric oil pump when a temperature of an electric motor cooled by oil dispensed at least from the electric oil pump is equal to or more than a predetermined temperature set in advance.

6. The control device according to claim 1, wherein the controller is configured to stop the electric oil pump when the mechanical oil pump is rotated in reverse.

7. The control device according to claim 1, wherein the controller is configured to maintain restriction on the rotational speed of the electric oil pump until a predetermined time elapses since the mechanical oil pump is switched from reverse rotation to forward rotation.

8. The control device according to claim 1, wherein the controller is configured to stop restricting the rotational speed of the electric oil pump instantly when the mechanical oil pump is switched from reverse rotation to forward rotation.

9. The control device according to claim 1, wherein in the vehicle oil supply device, a suction opening of the mechanical oil pump and a suction opening of the electric oil pump are disposed adjacent to each other.

10. The control device according to claim 1, wherein the vehicle oil supply device includes an oil path provided between a dispensing port of the electric oil pump and a second dispensing port of the mechanical oil pump.

11. The control device according to claim 10, wherein the oil path includes a check valve configured to allow the oil to irreversibly flow from the dispensing port of the electric oil pump to the second dispensing port of the mechanical oil pump.

12. The control device according to claim 1, wherein the mechanical oil pump is configured to be driven by a rotary member that operates in conjunction with an axle of a vehicle.

* * * * *